(12) United States Patent
Green

(10) Patent No.: US 7,410,522 B2
(45) Date of Patent: Aug. 12, 2008

(54) FERTILIZER

(76) Inventor: Kerry Green, 501-5 Donald Street, Winnipeg Manitoba (CA) R3C 3Z3

( * ) Notice: Subject to any disclaimer, the term of this patent is extended or adjusted under 35 U.S.C. 154(b) by 555 days.

(21) Appl. No.: 10/416,042

(22) PCT Filed: Nov. 7, 2001

(86) PCT No.: PCT/CA01/01563

§ 371 (c)(1),
(2), (4) Date: Sep. 25, 2003

(87) PCT Pub. No.: WO02/38521

PCT Pub. Date: May 16, 2002

(65) Prior Publication Data

US 2004/0050126 A1    Mar. 18, 2004

Related U.S. Application Data

(60) Provisional application No. 60/301,826, filed on Jul. 2, 2001, provisional application No. 60/293,209, filed on May 25, 2001, provisional application No. 60/268,803, filed on Feb. 13, 2001, provisional application No. 60/246,578, filed on Nov. 8, 2000.

(51) Int. Cl.
    *C05D 9/02*    (2006.01)
(52) U.S. Cl. .......................... 71/31; 71/64.1
(58) Field of Classification Search ............... 71/31, 71/64.1
    See application file for complete search history.

(56) References Cited

U.S. PATENT DOCUMENTS

| | | | |
|---|---|---|---|
| 2,786,746 A * | 3/1957 | Goldhaar .................. 71/40 |
| 3,635,691 A * | 1/1972 | Earl ........................ 71/59 |
| 4,026,695 A * | 5/1977 | Young ..................... 71/28 |
| 4,036,627 A | 7/1977 | Funk |
| 4,042,366 A * | 8/1977 | Fersch et al. ............. 71/29 |
| 4,238,072 A * | 12/1980 | Licursi ................... 239/1 |
| 4,321,078 A * | 3/1982 | Michaud .................. 71/44 |
| 5,432,146 A * | 7/1995 | Winston ................. 504/101 |
| 5,849,060 A * | 12/1998 | Diping et al. ........... 71/64.07 |
| 5,851,260 A * | 12/1998 | Aijala et al. ............. 71/28 |
| 6,322,607 B1 * | 11/2001 | Brown et al. ............. 71/33 |
| 2002/0108415 A1* | 8/2002 | Volgas et al. ............. 71/11 |

FOREIGN PATENT DOCUMENTS

DE    1592804    2/1971
FR    2599736    12/1987

OTHER PUBLICATIONS

Combs, "Fertility & Soils", vol. 5, No. 25, 1998, downloaded from ipcm.wisc.edu/wcm/pdfs/1998/wcm98-25.pdf.*
Shugar et al. Chemical Technicians' Ready Reference Handbook, Published 1996, McGraw-Hill Professional, Technology & Industrial Arts, pp. 593-595.*

* cited by examiner

*Primary Examiner*—C. Sayala
(74) *Attorney, Agent, or Firm*—Michael R. Williams; Ryan W. Dupuis; Adrian D. Baitison

(57) ABSTRACT

A liquid fertilizer is described. The fertilizer comprises a mixture of soluble and insoluble forms of nutrients. The fertilizer provides both quick release and slow release nutrients to plants, meaning that a single application of the fertilizer supplies nutrients to growing plants for an extended period of time, from 1-28 days.

9 Claims, No Drawings

FERTILIZER

PRIOR APPLICATIONS

This application claims priority under 35 USC § 119(e) to U.S. Ser. No. 60/246,578, filed Nov. 8, 2000, U.S. Ser. No. 60/268,083, filed Feb. 13, 2001, U.S. Ser. No. 60/293,209, filed May 25, 2001 and U.S. Ser. No. 60/301,826, filed Jul. 2, 2001.

FIELD OF THE INVENTION

The present invention relates generally to the field of chemical fertilizers.

BACKGROUND OF THE INVENTION

Carbon, hydrogen, oxygen, nitrogen, phosphorus and sulphur are the primary elements essential to all life. Soils contain all of these elements in addition to other macro and micronutrients which are needed for plant growth. Typically, such elements are not present in the soil in sufficient quantity or in forms that can support maximum plant growth and yield. In order to overcome these deficiencies, fertilizers having specific chemical constituents in specific amounts are often added to the soil, thereby enriching the growth medium. The fertilizers may be supplemented with certain trace elements such as copper, iron, manganese, zinc, cobalt, molybdenum, and boron, as oxides or salts containing the elements in the cationic form.

Agriculturally, metal ions are essential nutrients for plant growth. Soil deficiency because of the unavailability or exhaustion of metal ions is very often the cause of poor plant growth. Both soil and foliar application of metal ions are routinely used to prevent, correct or minimize soil deficiencies.

The prior art teaches two basic types of fertilizers—fast uptake fertilizers and slow uptake fertilizers. The fast uptake fertilizers are typically liquid fertilizers which are easily assimilated by plants and can be easily and evenly applied either to the soil or directly onto the plants. The slow uptake fertilizers are typically dry fertilizers which are pellets or granules. The dry fertilizers are generally applied to the ground. The dry fertilizers are often coated in either clay or other biodegradable coatings. Over time, typically up to three weeks, the coating decays due to exposure to moisture and other elements, causing the fertilizer to be released into the soil where it is taken up by the plant. Liquid or fluid fertilizers are generally preferred due to the ease of handling, versatility of application and uniform application.

The prior art teaches several examples of liquid fertilizers. For example, U.S. Pat. No. 4,356,021 teaches a liquid fertilizer composed of ammonium thiosulfate and zinc oxide; U.S. Pat. No. 5,372,626 teaches a composition comprising metal ions and citric acid which is applied to plant roots; U.S. Pat. No. 5,997,600 teaches fertilizer additives including chelated metal ions, specifically, metal oxides; and U.S. Pat. No. 4,404,146 teaches a method of making metal oxyalkylates for use in supplying said metal to plants or animals, which involves reacting the metal with carboxylic acid and hydrogen peroxide in an aqueous reaction mixture.

Similarly, the prior art also teaches several examples of slow release fertilizers or coated fertilizers. For example, U.S. Pat. No. 5,435,821 teaches a vegetation enhancement agent comprising a mixture of at least one macronutrient, micronutrient, slow release fertilizer or nitrogen fertilizer and a pesticide, which is then coated with a sulfonated polymer which acts as a controlled release coating; U.S. Pat. No. 5,725,630 teaches a method for preparing a liquid fertilizer containing alkanoic acids which is subsequently mixed with a granular carrier, producing a dry granule fertilizer; U.S. Pat. No. 5,748,936 teaches a process for producing granular fertilizer using a slurry of clay in water, followed by screening to remove granules of undesired size; U.S. Pat. No. 5,002,601 teaches a method for preparing a suspension fertilizer wherein nutrient material and at least one crystal growth inhibitor are mixed with potassium chloride and clay is subsequently added as a suspending aid; and U.S. Pat. No. 6,039,781 teaches a controlled release fertilizer formed from nutrient granules coated in first an organic oil and second a polymeric encapsulating coating.

However, the prior art does not teach a fertilizer or supplement that combines both quick uptake and slow uptake. Furthermore, simply combining a liquid fertilizer and a dry fertilizer as known in the art does not produce a desirable product, due to obvious difficulties with mixing and subsequent application of the product.

The prior art teaches the use of oxide forms of nutrients as slow release liquid fertilizers arranged for foliar application. Typically, the oxides are in a highly basic form. Similarly, the use of sulfate forms of nutrients for quick release fertilizers is also known. However, the sulfates are typically very acidic, meaning that simply combining the oxide fertilizer and the sulfate fertilizer leads to precipitation of nutrients and a nonfunctional product.

This is a concern, as it is often necessary or desirable to apply fertilizers and/or supplements several times over the course of a growing season. As will be appreciated by one knowledgeable in the art, with each application, there is an inherent risk that damage will occur to the plants, thereby reducing crop value. This does not include the inherent cost involved in dedicating time and resources to the task of fertilizing. Furthermore, with multiple applications, there is significant risk that the required nutrients may not be available during an important stage in the plant's development.

Clearly, a single fertilizer having both short term, quick uptake nutrients and long term, slow uptake nutrients that can be applied in a single application is needed.

SUMMARY OF THE INVENTION

According to a first aspect of the invention, there is provided a nutrient fertilizer comprising a soluble form of the nutrient and an insoluble form of the nutrient.

The insoluble form of the nutrient may be coated and suspended.

The soluble form of the nutrient may be dissolved.

The nutrient may be selected from the group consisting of zinc, copper, manganese, boron, calcium, calcium sulfate (gypsum), magnesium, molybdenum, chloride, selenium, phosphate, nitrogen, potassium, sulfur and iron.

The fertilizer may be in a dry form.

The fertilizer may include at least one other micronutrient.

According to a second aspect of the invention, there is provided a method for improving crop yield comprising: providing a nutrient fertilizer comprising a soluble form of the nutrient and an insoluble form of the nutrient; and applying the fertilizer to soil and/or leaves of growing plants, wherein growth of the plant is promoted by providing the nutrient to the plant for an extended period of time.

The extended period of time may be 1-28 days.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Definitions

As used herein, "nutrient" refers to both micronutrients and macronutrients, for example, zinc, copper, manganese, boron, calcium, iron, calcium sulfate (gypsum), magnesium, molybdenum, chloride, selenium, phosphate, nitrogen, potassium and sulfur.

As used herein, "micronutrients" refers to elements required in small or trace amounts for plant growth, for example, molybdenum, nickel, copper, zinc, manganese, boron, iron and chloride.

As used herein, "macronutrients" refers to elements typically required in large amounts for plant growth, for example, sulfur, phosphorus, phosphate, magnesium, calcium, potassium, nitrogen, oxygen, carbon and hydrogen.

As discussed above, existing nutrient inputs provide either an immediate short-term boost or a long-term slow release of the nutrient to the plant. Typically, a fast uptake fertilizer supplies the plant with nutrients from the time of application until approximately 14 days after application. On the other hand, slow uptake fertilizers supply micronutrients from 10-14 days after application until approximately 28 days after application. As will be apparent to one knowledgeable in the art, application at desired times may not be possible, as a result of weather conditions and/or the stage of plant development. As a consequence, required nutrients may not be available when needed most using these traditional fertilizers. This in turn would have a significant impact on yield.

Described herein is a nutrient fertilizer which provides both fast uptake and slow uptake nutrients. Specifically, the fertilizer comprises a combination of a soluble form of at least one nutrient and an insoluble form of the nutrient. That is, the fertilizer is a true solution mixed with a suspension. The fertilizer is arranged to be applied to the leaves of the plant, as foliar application of nutrients is more efficient than soil application for delivering adequate and uniform amounts of nutrients for plant uptake. Typically, soil applied nutrients are required at concentrations three to six times higher than foliar application. This is because the soil application requires the soil chemistry to move the nutrients to the plant root system whereas with the foliar application, the nutrients are applied right on the plant. It is of note however that in other applications the fertilizer described herein may be applied to the soil. The soluble form is highly water-soluble and is immediately absorbed by the plant, typically within 48 hours, thus giving the short-term boost in nutrients needed. The insoluble form is in a suspension and is absorbed by the plant over time, up to 3-4 weeks after application.

Specifically, prior to mixing, the insoluble form of the nutrient is coated and the soluble form of the nutrient may be acidified or otherwise modified if necessary, thereby allowing the two components to be mixed together. Thus, the fertilizer comprises a mixture of soluble nutrients and insoluble nutrients. While dry nutrients may be mixed together for soil application, the fertilizer described herein is applied as a liquid to the leaves of crops. As discussed above, when mixing these materials in solution, physical compatibility is an issue. The fertilizer described herein involves a saturation of soluble nutrients and then a suspension component which provides high analysis, ready availability (through soluble saturation) and continued availability through the suspension aspect. Thus, the fertilizer described herein is a mixture of soluble and insoluble elements, whereas the prior art focuses on making insoluble products completely soluble.

A distinct advantage of this arrangement is that the fertilizer can be co-applied at the fungicide/herbicide application stage, meaning that the farmer only goes over the field once.

It is of note that, in one embodiment, the fertilizer may be arranged such that approximately 67% of the nutrient in the fertilizer is in the insoluble form while 33% is in the soluble form. As will be appreciated by one knowledgeable in the art, other ranges, for example, 50-90% insoluble and 10-50% soluble, or 60-75% insoluble and 25-40% soluble, or 65-70% insoluble and 30-35% soluble, may also be used.

The nutrient may be, for example, zinc, copper, manganese, boron, calcium, iron, calcium sulfate (gypsum), magnesium, molybdenum, chloride, selenium, phosphate, nitrogen, potassium, sulfur or combinations thereof. By way of illustrative but in no way limiting examples, copper may be copper (cupric): hydroxide, chloride, sulfate, oxide, oxysulfate, nitrate, carbonate, ammonium carbonate, cupric chloride dihydrate, proteinate, acetate, citrate, chelate, complex, or sequestered; zinc may be zinc: acetate, amoniated zinc, ammonium chloride, sulfate, oxide, oxysulfate, nitrate, chloride, citrate, chelate, or complex sequestered; manganese (manganous) may be manganese: nitrate, chloride, sulfate, oxide, oxysulfate, acetate anhydrous, carbonate, potassium mangagnese sulfate, acetate tetrahydrate, nitrate hexahydrate, citrate, chelate, or complex sequestered. Boron may be: boric acid, sodium borate, potassium tetraborate tetrhydrate, calcium borate, calcium-sodium borate, US Borax Products tradenames—solubor™ (disodium octoborate tetrahydrate), Optibor™ (orthoboric acid), granubor™, borax™, or fertibor™; Calcium may be calcium: carbonate, chloride, sulfate, gypsum, calcium borate, lime, nitrate, phosphate, citrate, chelate, or complex sequestered; and Iron may be iron: sulfate, sulfate anhydrous, chloride, tetrahydrate, hexahydrate, nitrate, nitrate nonahydrate, chloride hexahydrate, ammonium citrate, ammonium sulfate, chelate, sequestered, or complex.

As will be apparent to one knowledgeable in the art, the fertilizer may have any suitable or desirable nutrient concentration, whether a single nutrient or a combination thereof. That is, the concentration of the nutrient(s) may vary from 1-99%, depending upon intended use and application conditions. In some embodiments, the fertilizer may have a nutrient concentration of, for example: 5-45% zinc; 5-45% copper; 5-45% manganese or a mixture of 7% copper, 7% zinc and 6% magnesium. As will be apparent to one knowledgeable in the art, the concentrations of the nutrients may be varied according to customer preference, soil conditions and/or need, depending on the circumstances. Other embodiments are shown in the examples.

As discussed above, in some embodiments, the fertilizer may be applied directly to the soil rather than to the leaves of the plants.

The fertilizer may comprise soluble and insoluble forms of more than one nutrient.

The fertilizer may include thickeners and other chemicals known in the art for use with foliar fertilizers, for example, pesticides and the like.

In some embodiments, the fertilizer is converted to a dry fertilizer, for example, a dry dispersible granule, using means known in the art and as described herein in the examples. In this arrangement, the fertilizer is "dried" by removing the majority of the water, which makes the fertilizer easier to store and transport. It is of note that the dry granule is rehydrated prior to application.

In some embodiments, the fertilizer is an aqueous flowable concentrate consisting of a water soluble nutrient salt and a water insoluble nutrient salt as active ingredients. The fertilizer also includes a dispersing agent, a wetting agent, a thickening agent and water. The thickening agent may be made up of several components and may include a preservative to prevent microbial growth in the formulation.

The soluble form may be a sulfate form of the nutrient, for example, copper sulfate produced, for example, by dissolution of metallic copper in sulfuric acid, zinc sulfate produced, for example, by dissolution of metallic zinc in sulfuric acid, manganese sulfate or the like or the soluble form may be manganese chloride, potassium borate, potassium tetraborate tetrahydrate or the like. As will be appreciated by one knowledgeable in the art, other nutrients may be similarly prepared using means known in the art.

The insoluble form may be an oxide form of the nutrient, for example, copper oxide, produced, for example, by pyrolysis of copper nitrate, zinc oxide, produced, for example, by pyrolysis of zinc nitrate or carbonate, manganese oxide or the like or the insoluble form may be boric acid, manganese sulfate or the like. As will be appreciated by one knowledgeable in the art, other nutrients may be similarly prepared using means known in the art.

As discussed above, the insoluble form of the nutrient is coated to allowing mixing with other components of the fertilizer such that the insoluble form of the nutrient is suspended within the fertilizer. As described below, in some embodiments, the insoluble form of the nutrient is coated with the wetting and/or dispersing agents. For example, copper oxide and zinc oxide may be coated with Morwet D425 and Aerosol OT-B or other suitable agents known in the art. Manganese oxide may, for example, be coated with Soprophor S/40-P in combination with 45% KOH or other suitable agents known in the art.

In these embodiments, the fertilizer is prepared by adding the soluble form of the nutrient prepared as described above to the water and the mixing agent. The mixture is stirred and a dispersing agent is added. The insoluble form of the nutrient is then added, along with the thickening agent.

The invention will now be illustrated by examples, which do not, however, restrict the invention in any way.

In the Examples, the wetting agent comprises Aerosol OT-B, a synthetic wetting agent of the class sodium dioctyl sulfusuccinate. As will be apparent to one knowledgeable in the art, other suitable wetting agents may also be used.

In the Examples, the dispersing agent is Morwet D425, a synthetic dispersing agent of the class sodium alkylnaphthylene sulfonate. As will be apparent to one knowledgeable in the art, other suitable dispersing agents may also be used.

In the Examples, the thickening agent comprises a mixture of propylene glycol (antifreeze), Rhodopol 23 (xanthan gum), Vangel B (thickening agent of the type magnesium aluminum silicate) and Legend MK (antimicrobial agent of class isothiazolinone). As will be apparent to one knowledgeable in the art, other suitable components may be substituted or used in the thickening agent.

In the Examples, starch is used as a component of the formulas. As will be appreciated by one knowledgeable in the art, other suitable materials, for example, clays, for example, kaolin, may be substituted.

EXAMPLE I

Copper Fertilizer

In one embodiment, a fertilizer according to the above described invention is prepared wherein the metal is copper, having a general formula as described below:
21.33% CuO
15.87% $CuSO_4$
0.10% Aerosol OT-B
1.50% Morwet D425
1.25% Propylene glycol
0.50% Rhodopol 23
1.25% Vangel B
0.375% Legend MK
water q.s. to 100%

An example is herein provided wherein 10000 liters of fertilizer is prepared. As will be appreciated by one knowledgeable in the art, the order of addition of the ingredients is important in making this formulation, as is the type of mixer used, although other suitable mixers may also be used. Three mixing vessels are required to produce the product. The product is a blend of an aqueous suspension concentrate with a thickening agent made from of two components. The process involves producing two gums mixture concentrates, which are then blended into the copper fertilizer slurry to produce the finished product.

In this example, Vessel #1 is a 200-liter drum with lightning mixer clamped onto the side.

In this example, Vessel #2 is a vessel of 3,000-5,000 liter capacity incorporating a paddle stirrer with 2, 3-blade paddles on the shaft, one close to the bottom of the tank and the other about half way up. The tank may be baffled but should be capable of giving good, efficient mixing.

In this example, Vessel #3 is a vessel of approximately 10,000 liter capacity incorporating a paddle stirrer with 2, 3-blade paddles on the shaft, one close to the bottom of the tank and the other about half way up.

| Rhodopol 23 suspension | |
|---|---|
| Propylene glycol | 125 Kg |
| Rhodopol 23 | 50 Kg |
| Vangel B suspension | |
| Water | 2162.5 L |
| Legend MK | 37.5 Kg |
| Vangel B | 125 Kg |

Into mixing vessel #1 (approx. 200 liter capacity), weigh the batch quantity (125 Kg) of propylene glycol add the batch quantity (50 Kg) of Rhodopol 23 with stirring using a Lightning mixer. High-shear mixing is not required at this stage.

Into mixing vessel #2 (approx. 3,000 liter capacity), add 2162.5 L of water and 37.5 Kg of Legend MK followed by 125 Kg of Vangel B and mix for 30 minutes using a high speed paddle stirrer. If high-shear mixing is available it should be used for 15 minutes at this stage, if not, vigorous paddle stirring for 30 minutes should be adequate.

| | Fertilizer formulation composition for 10,000 L |
|---|---|
| Water | 3,620 L |
| Aerosol OT-B | 10 Kg |

-continued

| | Fertilizer formulation composition for 10,000 L |
|---|---|
| Morwet D425 | 150 Kg |
| Copper sulfate | 1,587 Kg |
| Copper oxide | 2,133 Kg |
| Vangel B suspension from (A) above | 2325 Kg |
| Rhodopol 23 suspension from (A) above | 175 Kg |

Into mixing vessel #3 (approx. 10,000 liter capacity) charge 3,620 L of water and add the batch quantity, (10 Kg) of Aerosol OT-B and stir gently with a paddle stirrer. Add the batch quantities of Morwet D425 (150 Kg), Copper sulfate (1,587 Kg) and copper oxide (2,113 Kg) in that order with constant stirring. Allow the mixture to stir for 30 minutes and then add the Vangel B solution by pumping from vessel #2. Allow the mixture to stir for 30 minutes to facilitate swelling of the gum. Add the Rhodopol 23 solution by pumping from vessel #1, at this stage the product will thicken slightly. Continue paddle stirring for 30 minutes. Discharge and pack as required.

It is of note that the dilution of this formulation in water was found to give a good, spontaneous bloom in both hard and soft water with good after dilution suspensibility.

In another embodiment, there is provided a formula and a method for preparing 1000 l batches:

| Ingredient | Amount (Kg) | |
|---|---|---|
| CuO grade 07-7750 (75% Cu) | 213.3 | 16.0% Cu |
| CuSO$_4$.5H$_2$O grade 07-7300 (25.2% Cu) | 158.7 | 4.0% Cu |
| Aerosol OT-B | 1.0 | |
| Morwet D425 | 15.0 | |
| Propylene glycol | 12.5 | |
| Rhodopol 23 | 2.5 | |
| Vangel B | 12.5 | |
| Legend MK | 3.75 | |
| Water | 578.25 | |

The order of addition of the ingredients is important in making this formulation, as is the type of mixer used. Two mixing vessels are required to produce the product. The product is made by blending an aqueous suspension concentrate with a thickening agent. The procedure for product preparation is outlined below.

Mixing Equipment: To Produce a 1,000 Kg Batch of Finished Product
Vessel #1: This vessel can be a small pail of approximately 30 liter capacity.
Vessel #2: This should be a vessel of 1,500-2,000 liter capacity incorporating a paddle stirrer with 2, 3-blade paddles on the shaft, one close to the bottom of the tank and the other about half way up. The tank may be baffled but should be capable of giving good, efficient mixing.

Mixing Procedure for Preparation of 1,000 Kilograms of Formulation:

| A) Preparation of gums solution. | |
|---|---|
| | Rhodopol 23 suspension |
| Propylene glycol | 12.5 Kg |
| Rhodopol 23 | 2.5 Kg |

Into mixing vessel #1 (approx. 30 liter capacity), weigh the batch quantity (12.5 Kg) of propylene glycol add the batch quantity (2.5 Kg) of Rhodopol 23 and stir with a paddle stirrer. High-shear mixing is not required at this stage.

| B) Preparation of 1,000 Kg of fertilizer suspension. | |
|---|---|
| | Fertilizer formulation composition for 1,000 Kg |
| Water | 578.25 Kg |
| Vangel B | 12.5 Kg |
| Aerosol OT-B | 1.0 Kg |
| Morwet D425 | 15.0 Kg |
| Copper sulfate | 158.7 Kg |
| Copper oxide | 213.3 Kg |
| Rhodopol 23 suspension from (A) above | 15.0 Kg |
| Legend MK | 3.75 Kg |

Into mixing vessel #2 (approx. 1,500 liter capacity) charge 578.25 Kg of water and add the batch quantity, (12.5 Kg) of Vangel B and stir vigorously with a paddle stirrer for 30 minutes to facilitate swelling of the gum. Add the batch quantities of Aerosol OT-B (1.0 Kg), Morwet D425 (15.0 Kg), copper sulfate (158.7 Kg) and copper oxide (213.3 Kg) in that order with constant stirring. Allow the mixture to stir for 30 minutes and then add the Rhodopol 23 solution by pouring from vessel #1, at this stage the product will thicken slightly. Continue paddle stirring for 30 minutes. Add the batch quantity of Legend MK (3.75 Kg) and stir for another 30 minutes. Discharge and pack as required.

The desired viscosity for the finished formulation is 2,500±500 cps. If the product is below this value add more Rhodopol 23+propylene glycol solution to increase the viscosity as necessary.

The dilution of this formulation in water was found to give a good, spontaneous bloom in both hard and soft water with good after dilution suspensibility.

EXAMPLE II

Zinc Fertilizer

In one embodiment, a fertilizer according to the above described invention is prepared wherein the metal is copper, having a general formula as described below

| ZnO | 27.78% |
|---|---|
| ZnSO$_4$.H$_2$O | 5.63% |
| Aerosol OT-B | 0.10% |
| Morwet D425 | 1.50% |
| Propylene glycol | 1.25% |
| Rhodopol 23 | 0.25% |
| Vangel B | 1.25% |
| Legend MK | 0.375% |
| Water | 61.87% |

The order of addition of the ingredients is important in making this formulation, as is the type of mixer used, although other suitable mixers may also be used. Three mixing vessels are required to produce the product. The product is a blend of an aqueous suspension concentrate with a thickening agent made from of two components. The process involves producing two gums mixture concentrates, which are then blended into the zinc fertilizer slurry to produce the finished product. The actual procedure for product preparation is outlined below. The zinc oxide can sometimes contain some larger clumps and should be sieved through 60 mesh prior to use.

In the illustrative example herein, a 10000 liter batch of fertilizer is prepared.

Vessel #1 may be a 200 liter drum with lightning mixer clamped onto the side.

Vessel #2 may be a vessel of 3,000-5,000 liter capacity incorporating a paddle stirrer with 2, 3-blade paddles on the shaft, one close to the bottom of the tank and the other about half way up. The tank may be baffled but should be capable of giving good, efficient mixing.

Vessel #3 may be a vessel of approximately 10,000 liter capacity incorporating a paddle stirrer with 2, 3-blade paddles on the shaft, one close to the bottom of the tank and the other about half way up.

| Rhodopol 23 suspension | |
|---|---|
| Propylene glycol | 125 Kg |
| Rhodopol 23 | 25 Kg |
| Vangel B suspension | |
| Water | 2187.5 Kg |
| Legend MK | 37.5 Kg |
| Vangel B | 125 Kg |

Into mixing vessel #1 (approx. 200 liter capacity), weigh the batch quantity (125 Kg) of propylene glycol add the batch quantity (25 Kg) of Rhodopol 23 with gentle stirring using a paddle stirrer. High-shear mixing is not required at this stage. Into mixing vessel #2 (approx. 3,000 liter capacity), add 2187.5 Kg of water and 37.5 Kg of Legend MK followed by 125 Kg of Vangel B and mix for 30 minutes using a high speed paddle stirrer. If high-shear mixing is available it should be used for 15 minutes at this stage, if not, vigorous paddle stirring for 30 minutes should be adequate.

| | Fertilizer formulation composition for 10,000 Kg |
|---|---|
| Water | 3999 Kg |
| Aerosol OT-B | 10 Kg |
| Morwet D425 | 150 Kg |
| Zinc sulfate | 563 Kg |
| Zinc Oxide | 2778 Kg |
| Vangel B suspension from (A) above | 2350 Kg |
| Rhodopol 23 suspension from (A) above | 150 Kg |

Into mixing vessel #3 (approx. 10,000 liter capacity) charge 3999 Kg of water and add the batch quantity, (10 Kg) of Aerosol OT-B and stir gently with a paddle stirrer. Add the batch quantities of Morwet D425 (150 Kg), zinc sulfate (563 Kg) and zinc oxide (2778 Kg) in that order with constant stirring. Allow the mixture to stir for 30 minutes and then add the Vangel B solution by pumping from vessel #2. Allow the mixture to stir for 30 minutes to facilitate swelling of the gum. Add the Rhodopol 23 solution by pumping from vessel #1, at this stage the product will thicken slightly. Continue paddle stirring for 30 minutes. Discharge and pack as required.

The dilution of this formulation in water was found to give a good, spontaneous bloom in both hard and., soft water with good after dilution suspensibility.

In another embodiment, there is provided a formulation composition for 1,000 kilograms of formulation:

| Ingredient | Amount (Kg) | Active level |
|---|---|---|
| ZnO grade 07-8000 (72% Zn) | 277.8 | 20.0% Zn |
| ZnSO$_4$.H$_2$O grade 07-8361 (35.5% Zn) | 56.3 | 2.0% Zn |
| Aerosol OT-B | 1.0 | |
| Morwet D425 | 15.0 | |
| Propylene glycol | 12.5 | |
| Rhodopol 23 | 2.5 | |
| Vangel B | 12.5 | |
| Legend MK | 3.75 | |
| Water | 618.65 | |

The order of addition of the ingredients is important in making this formulation, as is the type of mixer used. Two mixing vessels are required to produce the product. The product is made by blending an aqueous suspension concentrate with a thickening agent. The procedure for product preparation is outlined below. The zinc oxide can sometimes contain some larger clumps and should be sieved through 60 mesh prior to use.

Mixing Equipment: To Produce a 1,000 Kg Batch of Finished Product

Vessel #1: This vessel can be a small pail of approximately 30 liter capacity.

Vessel #2: This should be a vessel of 1,500-2,000 liter capacity incorporating a paddle stirrer with 2, 3-blade paddles on the shaft, one close to the bottom of the tank and the other about half way up. The tank may be baffled but should be capable of giving good, efficient mixing.

Mixing Procedure for Preparation of 1,000 Kilograms of Formulation:

| (A) Preparation of gums solution. | |
|---|---|
| Rhodopol 23 suspension | |
| Propylene glycol | 12.5 Kg |
| Rhodopol 23 | 2.5 Kg |

Into mixing vessel #1 (approx. 30 liter capacity), weigh the batch quantity (12.5 Kg) of propylene glycol add the batch quantity (2.5 Kg) of Rhodopol 23 and stir with a paddle stirrer. High-shear mixing is not required at this stage.

| B) Preparation of 1,000 Kg of fertilizer suspension. | |
|---|---|
| | Fertilizer formulation composition for 1,000 Kg |
| Water | 618.65 Kg |
| Vangel B | 12.5 Kg |
| Aerosol OT-B | 1.0 Kg |
| Morwet D425 | 15.0 Kg |
| Zinc sulfate | 56.3 Kg |
| Zinc Oxide | 277.8 Kg |
| Rhodopol 23 suspension from (A) above | 15.0 Kg |
| Legend MK | 3.75 Kg |

Into mixing vessel #2 (approx. 1,500 liter capacity) charge 618.65 Kg of water and add the batch quantity, (12.5 Kg) of Vangel B and stir vigorously with a paddle stirrer for 30 minutes to facilitate swelling of the gum. Add the batch quantities of Aerosol OT-B (1.0 Kg), Morwet D425 (15.0

Kg), zinc sulfate (56.3 Kg) and zinc oxide (277.8 Kg) in that order with constant stirring. Allow the mixture to stir for 30 minutes and then add the Rhodopol 23 solution by pouring from vessel #1, at this stage the product will thicken slightly. Continue paddle stirring for 30 minutes. Add the batch quantity of Legend MK (3.75 Kg) and stir for another 30 minutes. Discharge and pack as required.

The desired viscosity for the finished formulation is 2,500±500 cps. If the product is below this value add more Rhodopol 23+propylene glycol solution to increase the viscosity as necessary.

The dilution of this formulation in water was found to give a good, spontaneous bloom in both hard and soft water with good after dilution suspensibility.

EXAMPLE III

Manganese Fertilizer

Formulation Composition for 10,000 Liters of Formulation:

| Ingredient | Amount (Kg) |
| --- | --- |
| MnO grade 07-6000 (60% Mn) | 1875 |
| MnSO$_4$ grade 07-5228 (29.5% Mn) | 1271 |
| Aerosol OT-B | 10 |
| Morwet D425 | 150 |
| Propylene glycol | 125 |
| Rhodopol 23 | 50 |
| Vangel B | 125 |
| Legend MK | 37.5 |
| Water (to 10,000 litres) | 7619.1 |

The order of addition of the ingredients is important in making this formulation, as is the type of mixer used. Three mixing vessels are required to produce the product. The product is a blend of an aqueous suspension concentrate with a thickening agent made from of two components. The process involves producing two gums mixture concentrates which are then blended into the Manganese fertilizer slurry to produce the finished product. The actual procedure for product preparation is outlined below.

Mixing Equipment: To Produce a 10,000 L Batch of Finished Product

Vessel #1: This vessel can be a 200 liter drum with lightning mixer clamped onto the side.

Vessel #2: This should be a vessel of 3,000-5,000 liter capacity incorporating a paddle stirrer with 2, 3-blade paddles on the shaft, one close to the bottom of the tank and the other about half way up. The tank may be baffled but should be capable of giving good, efficient mixing.

Vessel #3: This should be a vessel of approximately 10,000 liter capacity incorporating a paddle stirrer with 2, 3-blade paddles on the shaft, one close to the bottom of the tank and the other about half way up.

Mixing Procedure for Preparation of 10,000 Liters of Formulation:

| A) Preparation of gums solutions. | |
| --- | --- |
| Rhodopol 23 suspension | |
| Propylene glycol | 125 Kg |
| Rhodopol 23 | 50 Kg |

| A) Preparation of gums solutions. | |
| --- | --- |
| Vangel B suspension | |
| Water | 2162.5 L |
| Legend MK | 37.5 Kg |
| Vangel B | 125 Kg |

Into mixing vessel #1 (approx. 200 liter capacity), weigh the batch quantity (125 Kg) of propylene glycol add the batch quantity (50 Kg) of Rhodopol 23 with stirring using a Lightning mixer. High-shear mixing is not required at this stage. Into mixing vessel #2 (approx. 3,000 liter capacity), add 2162.5 L of water and 37.5 Kg of Legend MK followed by 125 Kg of Vangel B and mix for 30 minutes using a high speed paddle stirrer. If high-shear mixing is available it should be used for 15 minutes at this stage, if not, vigorous paddle stirring for 30 minutes should be adequate.

B) Preparation of 10,000 L of Fertilizer Suspension.

| | Fertilizer formulation composition for 10,000 L |
| --- | --- |
| Water | 5456.6 L |
| Aerosol OT-B | 10 Kg |
| Morwet D425 | 150 Kg |
| Manganese sulfate | 1271 Kg |
| Manganous oxide | 1875 Kg |
| Vangel B suspension from (A) above | 2325 Kg |
| Rhodopol 23 suspension from (A) above | 175 Kg |

Into mixing vessel #3 (approx. 10,000 liter capacity) charge 5456.6 L of water and add the batch quantity, (10 Kg) of Aerosol OT-B and stir gently with a paddle stirrer. Add the batch quantities of Morwet D425 (150 Kg), Manganese sulfate (1875 Kg) and manganous oxide (1271 Kg) in that order with constant stirring. Allow the mixture to stir for 30 minutes and then add the Vangel B solution by pumping from vessel #2. Allow the mixture to stir for 30 minutes to facilitate swelling of the gum. Add the Rhodopol 23 solution by pumping from vessel #1, at this stage the product will thicken slightly. Continue paddle stirring for 30 minutes. Discharge and pack as required.

The dilution of this formulation in water was found to give a good, spontaneous bloom in both hard and soft water with good after dilution suspensibility.

In another embodiment, the following formula is used:

| Ingredient | % w/w |
| --- | --- |
| Manganous oxide | 8.33 |
| Manganese chloride | 35.71 |
| Soprophor S40-P | 1.0 |
| Natrosol 250HR | 0.4 |
| Water | 54.56 |

In yet other embodiments, the fertilizer may be a mixture of 2% MnO and 18% MnCl$_2$ or a mixture of 2% MnO and 16% MnCl$_2$. As will be apparent to one knowledgeable in the art, other combinations are also possible, depending on consumer preference and soil conditions.

EXAMPLE IV

Production of Boron Micronutrient Fertilizer
Formulation Containing 20% Boron Salts Formulation Composition for 1,000 Kilograms of Formulation:

| Ingredient | Amount (Kg) |
|---|---|
| Boric acid | 100.0 |
| Potassium tetraborate tetrahydrate | 100.0 |
| Urea | 20.0 |
| Soprophor S/40-P | 10.0 |
| Propylene glycol | 50.0 |
| Rhodopol 23 | 2.5 |
| Vangel B | 12.5 |
| Water | to 1000.0 Kg |

Final product contains 20.0% boron salts.

The order of addition of the ingredients is important in making this formulation, as is the type of mixer used. Two mixing vessels are required to produce the product. The process involves pre-dispersing the Vangel B in water followed by addition of the actives, stabilizer and wetting agent in one vessel. The antifreeze and Rhodopol 23 (thickener solution) are blended together in a separate vessel. The thickener solution is then blended into the boron fertilizer suspension to produce the finished product. The actual procedure for product preparation is outlined below. High-shear mixing is required to adequately swell the Vangel B and to help reduce the particle size of the boric acid.

Mixing Equipment: To Produce a 1,000 Kg Batch of Finished Product
Vessel #1: This vessel can be a small pail of approximately 100 liter capacity.
Vessel #2: This should be a vessel of approximately 1,500 liter capacity incorporating a high-shear mixer.

Mixing Procedure for Preparation of 1,000 Kilograms of Formulation:

A) Preparation of gums solution.

| Rhodopol 23 suspension | |
|---|---|
| Propylene glycol | 50.0 Kg |
| Rhodopol 23 | 2.5 Kg |

Into mixing vessel #1 (approx. 100 liter capacity), weigh the batch quantity (50 Kg) of propylene glycol add the batch quantity (2.5 Kg) of Rhodopol 23 and stir with a paddle stirrer. High-shear mixing is not required at this stage.

B) Preparation of 1,000 Kg of fertilizer suspension.

| | Fertilizer formulation composition for 1,000 Kg |
|---|---|
| Water | 705.0 Kg |
| Vangel B | 12.5 Kg |
| Potassium tetraborate tetrahydrate | 100.0 Kg |
| Boric acid | 100.0 Kg |
| Urea | 20.0 Kg |
| Soprophor S40-P | 10.0 Kg |
| Rhodopol 23 suspension from (A) above | 52.5 Kg |

Into mixing vessel #2 (approx. 1,500 liter capacity) charge 705 Kg of water and add the batch quantity, (12.5 Kg) of Vangel B and stir vigorously with a high-shear mixer for 30 minutes to facilitate swelling of the gum. Add the batch quantity of potassium tetraborate tetrahydrate (100 Kg) and agitate for 15 minutes. Add the batch quantity of boric acid (100 Kg) and agitate for 15 minutes. Replace the high-shear mixer with a paddle stirrer or remove the shear head from the mixer. Add the batch quantities of urea (20 Kg) and Soprophor S40-P (10 Kg) with constant agitation. Allow the mixture to stir for 30 minutes and then add the Rhodopol 23 solution by pouring from vessel #1, at this stage the product will thicken slightly. Continue paddle stirring for 30 minutes. Discharge and pack as required.

The desired viscosity for the finished formulation is 800±300 cps by Brookfield spindle #2 at 30 rpm. If the product is below this value add more Rhodopol 23+propylene glycol solution to increase the viscosity as necessary.

The dilution of this formulation in water was found to give a good, spontaneous bloom in both hard and soft water with good after dilution suspensibility.

EXAMPLE V

Production of Manganese Micronutrient Fertilizer
Formulation Containing 55.06% Manganese Salts
(20% Elemental Manganese)

Formulation Composition for 1,000 kilograms of formulation:-

| Ingredient | Amount (Kg) | Active level |
|---|---|---|
| $MnCl_2$ prills (42% Mn) | 238.1 | 10% Mn |
| $MnSO_4$ | 312.5 | 10% Mn |
| Soprophor S/40-P | 10.0 | |
| Urea | 20.0 | |
| Rhodopol 23 | 2.0 | |
| Propylene glycol | 50.0 | |
| Antifoam FG-10 | 0.5 | |
| Water | to 1000.0 Kg | |

The order of addition of the ingredients is important in making this formulation, as is the type of mixer used. Two mixing vessels are required to produce the product but high-shear mixing is not required. Mixing vessel #1 should be approximately 100 liter capacity with a paddle stirrer capable of 100-300 rpm. Mixing vessel #2 should be approximately 1,200 liter capacity with baffled sides and a paddle stirrer capable of 60-100 rpm.

The process involves pre-dispersing the Rhodopol 23 in the propylene glycol in one vessel whilst mixing the other components in a separate vessel. The Rhodopol thickener solution is then blended into the manganese fertilizer slurry to produce the finished product. The actual procedure for product preparation is outlined below. During dissolution of the manganese chloride the solution will become hot. Care should be take to ensure that all of the manganese chloride has dissolved before continuing with addition of other ingredients.

Mixing Procedure for Preparation of 1,000 Kilograms of Formulation:

A) Preparation of 52 Kg of thickener solution.

| Gums mixture composition for 250 Kg | |
|---|---|
| Rhodopol 23 | 2.0 Kg |
| Propylene glycol | 50.0 Kg |

Into mixing vessel #1 add 50 Kg of propylene glycol and start the agitation. With constant agitation carefully add 2 Kg of Rhodopol 23 into the vortex and continue stirring until ready to add to the main batch. The gum will not swell in the propylene glycol but will settle to the bottom when the agitation is stopped.

B) Preparation of 1,000 Kg of fertilizer suspension.

| | Fertilizer formulation composition for 1,000 Kg |
|---|---|
| Water | 348.9 Kg |
| Manganese chloride | 238.1 Kg |
| Soprophor S/40-P | 10.0 Kg |
| Urea | 20.0 Kg |
| Manganese sulfate | 312.5 Kg |
| Antifoam FG-10 | 0.5 Kg |
| Gums mixture from (A) above | 52.0 Kg |

Into mixing vessel #2 charge 368.9 Kg of water and start the agitation. Slowly add the batch quantity, (238.1 Kg) of Manganese chloride prills with constant agitation over a period of 30 minutes to avoid causing the temperature to rise too high. Continue stirring for 30 minutes after completion of addition to allow all of the manganese chloride to dissolve prior to continuing with addition of the other ingredients. Add the batch quantity of Soprophor S/40-P (10 Kg) and stir gently for 30 minutes to allow dissolution. Add the batch quantity of urea (20 Kg) and mix for 10 minutes. Add the batch quantity of Manganese sulfate (312.5 Kg) slowly taking care to keep air entainment to a minimum and continue stirring for 30 minutes to allow complete mixing. Add the batch quantity of Antifoam FG-10 (0.5 Kg) and mix for 5 minutes to help the surface foam break. Add the whole 52 Kg of the Rhodopol thickener solution from (A) above. Continue paddle stirring for 30 minutes. Discharge and pack as required.

The dilution of this formulation in water was found to give a good, spontaneous bloom in both hard and soft water with good after dilution suspensibility.

EXAMPLE VI

Production of Manganese Micronutrien Fertilizer Formulation Containing 55.06% Manganese Salts (20% Elemental Manganese). Formulation Composition for 1.000 Kilograms of Formulation

| Ingredient | Amount (Kg) | |
|---|---|---|
| $MnCl_2$ prills (42% Mn) | 238.1 | 10% Mn |
| $MnSO_4$ Super Man-Gro (32% Mn) | 312.5 | 10% Mn |
| Soprophor S/40-P | 10.0 | |
| Urea | 20.0 | |
| Rhodopol 23 | 3.0 | |
| Propylene glycol | 50.0 | |
| Antifoam FG-10 | 0.5 | |
| Water | to 1000.0 Kg | |

The order of addition of the ingredients is important in making this formulation, as is the type of mixer used. Two mixing vessels are required to produce the product but high-shear mixing is not required. Mixing vessel #1 should be approximately 100 liter capacity with a paddle stirrer capable of 100-300 rpm. Mixing vessel #2 should be approximately 1,200 liter capacity with baffled sides and a paddle stirrer capable of 60-100 rpm.

The process involves pre-dispersing the Rhodopol 23 in the propylene glycol in one vessel whilst mixing the other components in a separate vessel. The Rhodopol thickener solution is then blended into the manganese fertilizer slurry to produce the finished product. The actual procedure for product preparation is outlined below. During dissolution of the manganese chloride the solution will become hot. Care should be take to ensure that all of the manganese chloride has dissolved before continuing with addition of other ingredients.

Mixing Procedure for Preparation of 1,000 Kilograms of Formulation:

A) Preparation of 53 Kg of thickener solution.

| Gums mixture composition for 250 Kg | |
|---|---|
| Rhodopol 23 | 3.0 Kg |
| Propylene glycol | 50.0 Kg |

1. Into mixing vessel #1 add 50 Kg of propylene glycol and start the agitation. With constant agitation carefully add 3 Kg of Rhodopol 23 into the vortex and continue stirring until ready to add to the main batch. The gum will not swell in the propylene glycol but will settle to the bottom when the agitation is stopped.

B) Preparation of 1,000 Kg of fertilizer suspension.

| | Fertilizer formulation composition for 1,000 Kg |
|---|---|
| Water | 365.9 Kg |
| Manganese chloride | 238.1 Kg |
| Soprophor S/40-P | 10.0 Kg |
| Urea | 20.0 Kg |

-continued

B) Preparation of 1,000 Kg of fertilizer suspension.

| | Fertilizer formulation composition for 1,000 Kg |
|---|---|
| Manganese sulfate | 312.5 Kg |
| Antifoam FG-10 | 0.5 Kg |
| Gums mixture from (A) above | 53.0 Kg |

1. Into mixing vessel #2 charge 365.9 Kg of water and start the agitation.
2. Slowly add the batch quantity, (238.1 Kg) of Manganese chloride prills with constant agitation over a period of 30 minutes to avoid causing the temperature to rise too high. Continue stirring for 30 minutes after completion of addition to allow all of the manganese chloride to dissolve prior to continuing with addition of the other ingredients.
3. Add the batch quantity of Soprophor S/40-P (10 Kg) and stir gently for 30 minutes to allow dissolution.
4. Add the batch quantity of urea (20 Kg) and mix for 10 minutes.
5. Add the batch quantity of Manganese sulfate (312.5 Kg) slowly taking care to keep air entainment to a minimum and continue stirring for 30 minutes to allow complete mixing.
6. Add the batch quantity of Antifoam FG-10 (0.5 Kg) and mix for 5 minutes to help the surface foam break.
7. Add the whole 52 Kg of the Rhodopol thickener solution from (A) above.
8. Continue paddle stirring for 30 minutes. Discharge and pack as required.

The dilution of this formulation in water was found to give a good, spontaneous bloom in both hard and soft water with good after dilution suspensibility.

EXAMPLE VII

Dry Dispersible Granule

In this embodiment, the liquid fertilizer is prepared as discussed above and is converted to a dry fertilizer, in this example example, a dry dispersible granule. In this arrangement, the fertilizer is "dried" by removing the majority of the water, which makes the fertilizer easier to store and transport. It is of note that the dry granule is rehydrated prior to application.

Nutrient: % soluble+% insoluble=Total % Active (A)

Guaranteed Minimum Analysis (B)

| | % B\A |
|---|---|
| Morwet D424 | 5 |
| Morwet EFW | 2 |
| Kaolinn Clay Q5 | 0.1-30 |
| Total | 100% |

In other embodiments, as discussed below, starch is used in place of clay. As will be appreciated by one knowledgeable in the art, other suitable compounds may also be used in place of clay or starch.

Formulation and Spray Drying of Zinc Oxide and Sulfate

| Zinc Oxide Powder | 49.2 kg |
|---|---|
| Zinc Sulfate Powder | 10.8 kg |
| Morwent D425 Powder | 2 kg |
| EFW Powder | 2 kg |
| Anticaking agent (SiO$_2$) | 0.80 kg |
| Maltodextrin | 15.2 kg |

240 kg of soft water is placed in a tank under agitation and the chemicals listed above are added thereto. The mixture is mixed for approximately 30 minutes, that is, until a uniform slurry is obtained. The slurry is pumped to a spray dryer, a pilot plant in-line mixer and a strainer, in order to remove large foreign particles. The spray drying is then conducted using means known in art, under an inlet temperature of approximately 185-188° C., an outlet temperature of approximately 84-88° C. and a feed temperature of 30-60° C.

Formulation and Spray Drying of Copper Solution

| Copper Oxide Powder | 45 kg |
|---|---|
| Copper Sulfate Powder | 15 kg |
| Morwent D425 Powder | 2 kg |
| EFW Powder | 2 kg |
| Anticaking agent (SiO$_2$) | 0.80 kg |
| Maltodextrin | 15.2 kg |

240 kg of soft water is placed in a tank under agitation and the chemicals listed above are added thereto. The mixture is mixed for approximately 30 minutes, that is, until a uniform slurry is obtained. The slurry is pumped to a spray dryer, a pilot plant in-line mixer and a strainer, in order to remove large foreign particles. The spray drying is then conducted using means known in art, under an inlet temperature of approximately 185-188° C., an outlet temperature of approximately 84-88° C. and a feed temperature of 30-60° C.

EXAMPLE VIII

Formulation and Spray Drying of Manganese

Material: 1. Formulation of Manganese Chloride and Sulfate

| 20 kg of Manganese chloride powder | 32.43% |
|---|---|
| 26.25 kg of Manganese sulfate powder | 42.57% |
| 1.54 kg of Morwet D425 powder | 2.5% |
| 1.54 of EFW powder | 2.5% |
| 1.23 kg Urea | 2% |
| 0.62 kg of anticaking agent (SiO$_2$) | 1% |
| 10.48 kg of maltodextrin (star dry 5) | 17% |
| Total: 61.66 kg | 100% |

1. Directives
1.1 Add about 185 kg of soft water to a tank and have a good agitation.
1.2 Add the following ingredients to the tank under good agitation:

| | |
|---|---|
| 20 kg of Manganese chloride powder | 32.43% |
| 26.25 kg of Manganese sulfate powder | 42.57% |
| 1.54 kg of Morwet D425 powder | 2.5% |
| 1.54 of EFW powder | 2.5% |
| 1.23 kg Urea | 2% |
| 0.62 kg of anticaking agent (SiO$_2$) | 1% |
| 10.48 kg of maltodextrin (star dry 5) | 17% |
| Total: 61.66 kg | 100% |

1.3 Mix for 30 minutes until uniform slurry is obtained under good agitation.
1.4 Pump the slurry to the spray dryer (SD1) through a strainer in order to remove large foreign particles.
1.5 Conduct the spray drying under the following conditions:
Inlet Temperature: 185-188 C. °
Outlet Temperature: 84-88° C.
Feed Temperature: 25-60° C.

EXAMPLE IX

Formulation of Boron

| | | |
|---|---|---|
| 1. | Control Formulation #1 | |
| | Potassium Tetraborate, Disodium Octoborate Tetrahydrate, and Boric Acid: | 85% |
| | 42.42% potassium tetraborate (K$_2$B$_4$O$_7$.4H$_2$O) | |
| | 28.64% disodium octaborate tetrahydrate (Na$_2$B$_8$O$_{13}$.4H$_2$O) | |
| | 28.94% boric acid (H$_3$BO$_3$) | |
| | Dispersing Agent | 5% |
| | 50% Morwet D425 and 50% EFW | |
| | Kaolin Clay: | 10% |
| | Total: | 100% (w/w) |
| 2. | Test Formulation #1 | |
| | Potassium Tetraborate, Disodium Octoborate Tetrahydrate, and Boric Acid: | 85% |
| | 42.42% potassium tetraborate (K$_2$B$_4$O$_7$.4H$_2$O) | |
| | 28.64% disodium octaborate tetrahydrate (Na$_2$B$_8$O$_{13}$.4H$_2$O) | |
| | 28.94% boric acid (H$_3$BO$_3$) | |
| | Dispersing Agent | 5% |
| | 50% Morwet D424 and 50% EFW | |
| | Modified Starch: | 9% |
| | Anti-caking Agent (SiO$_2$): | 1% |
| | Total: | 100% (w/w) |

Note:
The targeted moisture level is in the of 2-4% for the control and test formulations. In the above formulation, approximately 35.18% actual boron form potassium tetraborate, 35.17% actual boron from disodium octaborate tetrahydrate, and 29.64% actual boron from boric acid.

EXAMPLE X

Formulation of Boron

| | |
|---|---|
| 3. Control Formulation #1 | |
| Potassium Tetraborate, Disodium Octoborate Tetrahydrate, and Boric Acid: | 75% |
| 48.08% potassium tetraborate (K$_2$B$_4$O$_7$.4H$_2$O) | |
| 32.46% disodium octaborate tetrahydrate (Na$_2$B$_8$O$_{13}$.4H$_2$O) | |
| 19.46% boric acid (H$_3$BO$_3$) | |
| Dispersing Agent | 5% |
| 50% Morwet D425 and 50% EFW | |
| Kaolin Clay: | 20% |
| Total: | 100% (w/w) |
| 4. Test Formulation #1 | |
| Potassium Tetraborate, Disodium Octoborate Tetrahydrate, and Boric Acid: | 75% |
| 48.08% potassium tetraborate (K$_2$B$_4$O$_7$.4H$_2$O) | |
| 32.46% disodium octaborate tetrahydrate (Na$_2$B$_8$O$_{13}$.4H$_2$O) | |
| 19.46% boric acid (H$_3$BO$_3$) | |
| Dispersing Agent | 5% |
| 50% Morwet D424 and 50% EFW | |
| Modified Starch: | 19% |
| Anti-caking Agent (SiO$_2$): | 1% |
| Total: | 100% (w/w) |

Note:
The targeted moisture level is in the range of 2-4% for the control and test formulations. In the above formulation, approximately 40% actual boron from potassium tetraborate, 40% actual boron from disodium octaborate tetrahydrate, and 20% actual boron from boric acid.

EXAMPLE XI

| Calcium Formula | |
|---|---|
| Calcium Nitrate | 7.5% |
| Calcium Chloride | 7.5% |
| Calcium Carbonate | 60% |
| Soprophor S/40-P | 3% |
| Water | 22% |

Prepared as described above in the other examples.

While the preferred embodiments of the invention have been described above, it will be recognized and understood that various modifications may be made therein, and the appended claims are intended to cover all such modifications which may fall within the spirit and scope of the invention.

The invention claimed is:

1. A fertilizer comprising:
a fast uptake form of a micronutrient selected from the group consisting of copper sulfate, zinc sulfate, manganese sulfate, iron sulfate, potassium tertraborate tetrahydrate, sodium octaborate and calcium nitrate; and
a slow uptake form of a micronutrient selected from the group consisting of copper oxide, zinc oxide, iron oxide, manganese oxide, manganese chloride, calcium carbonate and boric acid,
wherein the fast uptake form is in a form that is absorbed more readily by a plant than the slow uptake form, said slow uptake form being coated such that the slow uptake form and the fast uptake form can be mixed together in the fertilizer.

2. The fertilizer according to claim 1 wherein the slow uptake form is coated with a wetting or dispersing agent.

3. The fertilizer according to claim 1 in a dry dispersible granular form.

4. The fertilizer according to claim 1 wherein the fertilizer comprises 50-90% slow uptake form and 10-50% fast uptake form.

5. The fertilizer according to claim 1 wherein the fertilizer comprises 60-80% slow uptake form and 20-40% fast uptake form.

6. The fertilizer according to claim 1 wherein the fertilizer comprises 65-70% insoluble form and 30-35% soluble form.

7. A method for improving crop yield comprising:
providing a fertilizer comprising:
a fast uptake form of a micronutrient selected from the group consisting of copper sulfate, zinc sulfate, manganese sulfate, iron sulfate, potassium tetraborate tetrahydrate, sodium octaborate and calcium nitrate; and
a slow uptake form of a micronutrient selected from the group consisting of copper oxide, zinc oxide, iron oxide, manganese oxide, calcium carbonate, manganese chloride and boric acid,
wherein the fast uptake form is in a form that is absorbed more readily by a plant than the slow uptake form said slow uptake form being coated such that the slow uptake form and the fast uptake form can be mixed together in the fertilizer; and
applying the fertilizer to soil and/or leaves of growing plants.

8. The method according to claim 7 wherein the slow uptake form is coated with a wetting or dispersing agent.

9. The method according to claim 7 wherein the fertilizer is applied to the leaves of growing plants.

* * * * *